United States Patent [19]
Jones

[11] Patent Number: 5,924,460
[45] Date of Patent: Jul. 20, 1999

[54] METHOD AND DEVICE FOR CLEANING A BARBEQUE GRILL

[76] Inventor: Albert P. Jones, 38 Blairmore Dr., Hamilton Square, N.J. 08690

[21] Appl. No.: 08/928,579

[22] Filed: Sep. 12, 1997

[51] Int. Cl.$^6$ ........................................................ B65B 1/04
[52] U.S. Cl. .................................. 141/82; 134/6; 134/42
[58] Field of Search .......................... 134/6, 42; 229/242; 141/11, 82; 249/61, 117; 53/440, 127

[56] References Cited

U.S. PATENT DOCUMENTS

| | | |
|---|---|---|
| D. 259,619 | 6/1981 | Nicholson et al. . |
| D. 341,453 | 11/1993 | Roma et al. . |
| 2,965,499 | 12/1960 | Wise .......................................... 99/180 |
| 4,121,316 | 10/1978 | Perry . |
| 4,214,342 | 7/1980 | Amundsen . |
| 5,354,384 | 10/1994 | Sneed et al. . |
| 5,373,600 | 12/1994 | Stojanovski et al. . |
| 5,415,584 | 5/1995 | Brooke et al. . |
| 5,431,915 | 7/1995 | Harvey et al. ........................... 424/439 |

*Primary Examiner*—Steven O. Douglas
*Attorney, Agent, or Firm*—Watov & Kipnes, P.C.

[57] ABSTRACT

A device for cleaning a barbeque grill is described comprising a block of ice having a wedge-shaped cross-section at one end and handle of temperature insulating material at the other.

3 Claims, 7 Drawing Sheets

METHOD AND DEVICE FOR CLEANING A BARBEQUE GRILL

RELATED APPLICATION

The present invention is related to co-pending design Application Ser. No. (Attorney Docket No. 1025.1.002), entitled "CONTAINER FOR BARBEQUE GRILL CLEANING DEVICE," filed herewith, which has the same inventorship as the present invention.

FIELD OF THE INVENTION

The present invention is related to barbeque grill cleaning devices, and more particularly to such devices which are handheld.

BACKGROUND OF THE INVENTION

Preparing food by barbequing has become increasingly popular over the years. As is well known, the grill of a barbeque is formed of spaced parallel metal rods that support the food being cooked over a source of heat. Over a period of time sufficient residue from the food becomes baked onto the rods to require cleaning that is often difficult.

A number of devices for cleaning the rods of a grill have been made available. Some of them provide a scraping action, such as by a wire brush, but according to manufacturers of grills they can damage the rods. Other devices use a brush with bristles of plastic that do not damage the rods but which cannot be used when the rods are hot thus making the cleaning difficult. Furthermore, a bristle of any kind can be retained on a rod so as to contaminate the next batch of food that is cooked. Alternatively, the rods of the grill can be sprayed with a cleaning agent, but this is expensive, messy, and possibly unsafe for the environment.

SUMMARY OF THE INVENTION

In accordance with this invention, a piece of ice is formed and rubbed along the rods of a grill while they are hot. The hot rods form grooves in the ice that scrape foreign particles from them. It has been found that the steam formed in this process contributes significantly to the cleaning.

The ice is formed at one end of a suitably shaped mold, and a tear line is provided in the mold whereby that end of the mold can be easily removed so as to expose the ice. The other end of the mold, which is not removed, provides a convenient and comfortable means for holding the ice when it is being used for cleaning.

Although the molds made of cardboard or the like could be sold with water in them and frozen by a user well in advance of their use, it is more convenient to provide them in folded form so as to be flat and equipped with closeable openings so that a user can fill them with water when needed.

In another embodiment of the invention, the mold is suitable for reuse.

BRIEF DESCRIPTION OF THE DRAWINGS

Various embodiments of the invention are described in detail below with reference to the drawings, in which like items are identified by the same reference designation, wherein.

DESCRIPTION OF THE INVENTION

Figure 1A:
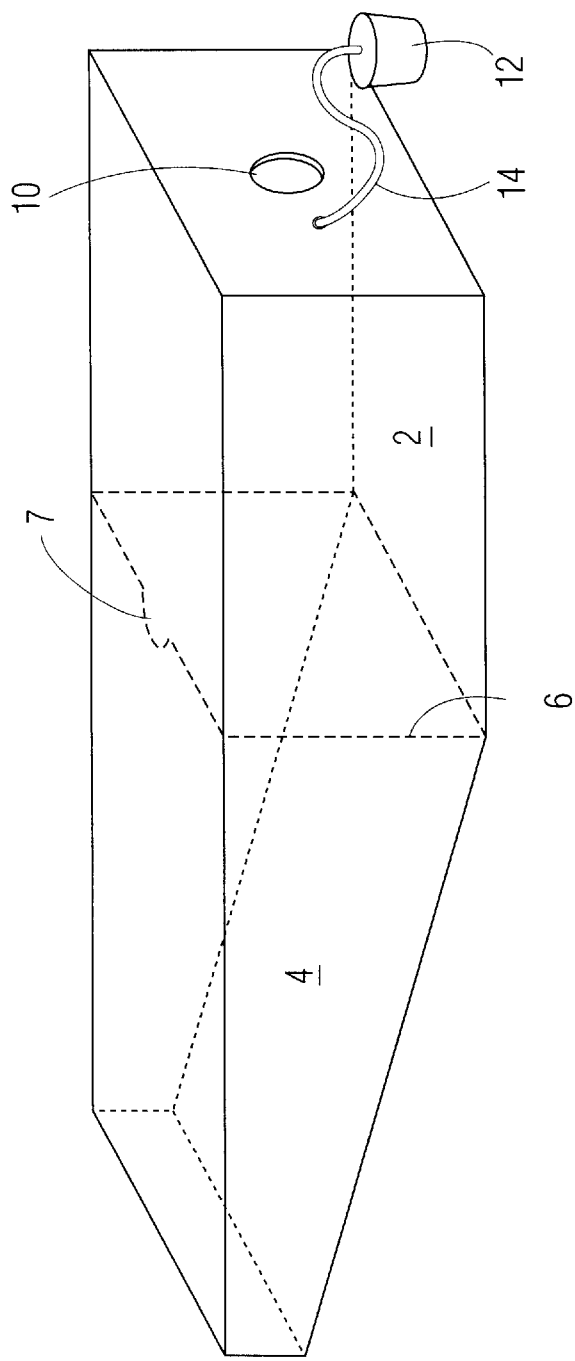
FIG. 1A shows a grill cleaner of this invention.
Figure 1B:
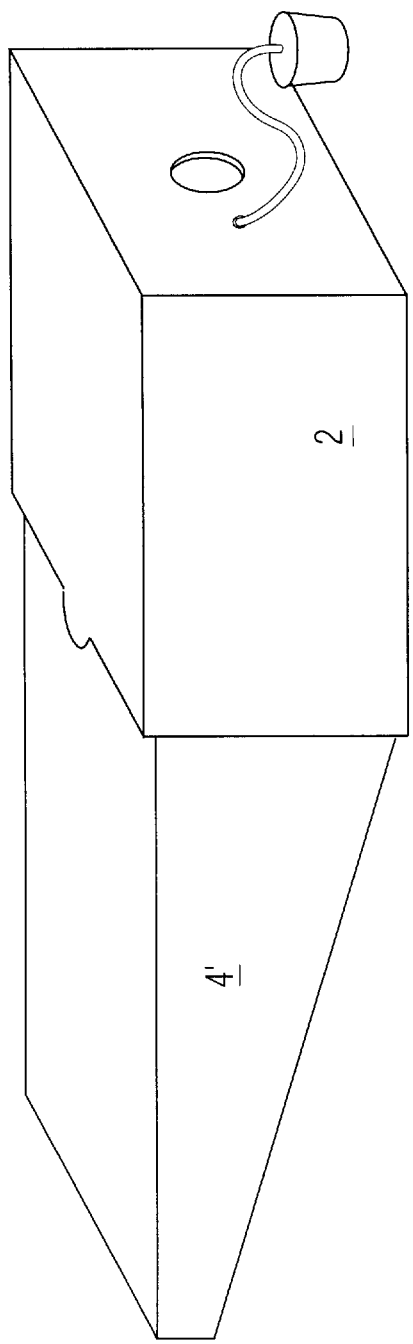
FIG. 1B shows the grill cleaner of FIG. 1A ready for use.

FIG. 1A shows a container made of inexpensive waterproof material, such as cardboard with a waxed inner surface, that has a rectangular end 2 and a wedge-shaped end 4 having a tear line 6 between them. A tab 7 may be provided to aid in the tearing. In one form of the invention, the container 2, 4, is filled with water when it is made available to a customer, and the customer freezes it before use. After freezing, the wedge-shaped section 4 of the container 2, 4 is uncovered by tearing along the tear line 6 so as to leave a wedge of ice 4' as shown in FIG. 1B. The portion of the container in the rectangular portion 4 serves as a handle with the container material 2 insulating the user's hand from the ice.

Figure 2:
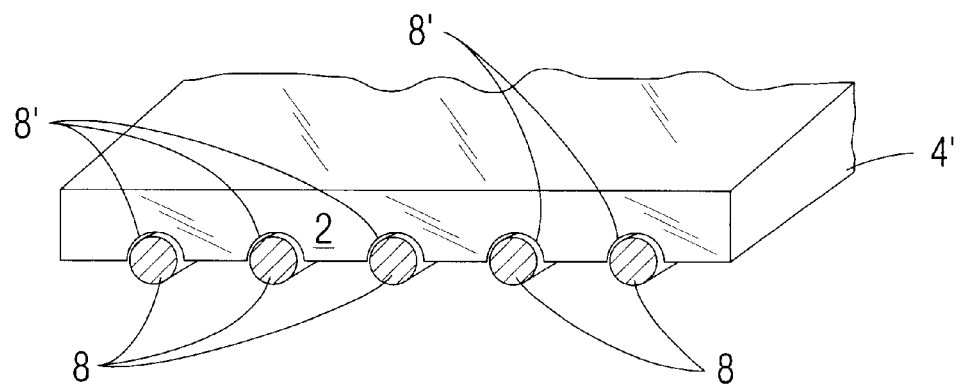
FIG. 2 illustrates how a grill cleaner of this invention is to be used.

The user then forces the wedge 4' of ice against rods 8 of a grill as shown in FIG. 2 and pushes it back and forth. When the rods 8 are hot, they melt grooves 8' in the wedge of ice 4' that scrape food particles from the rods. At the same time steam is formed that aids in the cleaning.

Because shipping a container 2, 4 filled with water might be awkward and expensive, it can be shipped in an empty condition and filled with water by the user via a hole 10. If the container 2, 4 remains upright during the freezing process, nothing more is needed, but a stopper 12 for the hole 10 is provided that is attached to the container 2, 4 by a thread 14 so that the container 2, 4 can be placed in any position during freezing.

Figure 3:
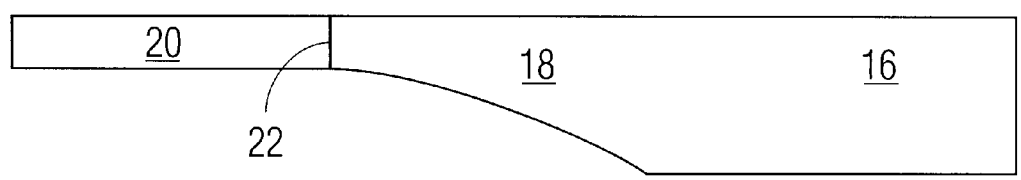
FIG. 3 is a side view of a second embodiment of a grill cleaner of this invention.
Figure 4A:
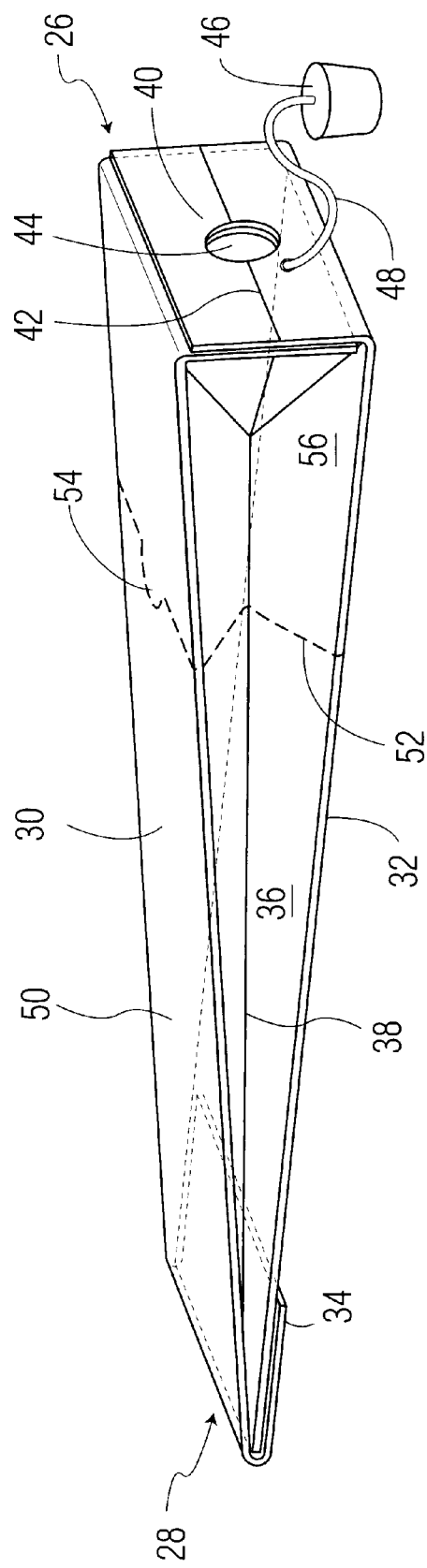
FIG. 4A is a pictorial view of a third embodiment of the invention.
Figure 4B:
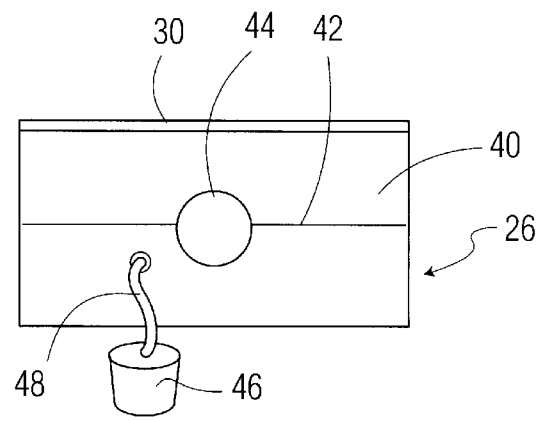
FIGS. 4B, 4C, and 4D are top, bottom, and side views, respectively, of the embodiment of FIG. 4A.
Figure 4C:
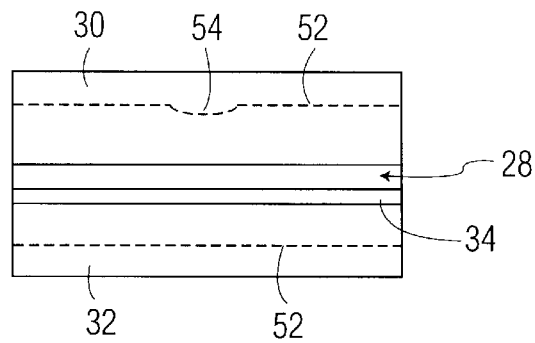
Figure 4D:
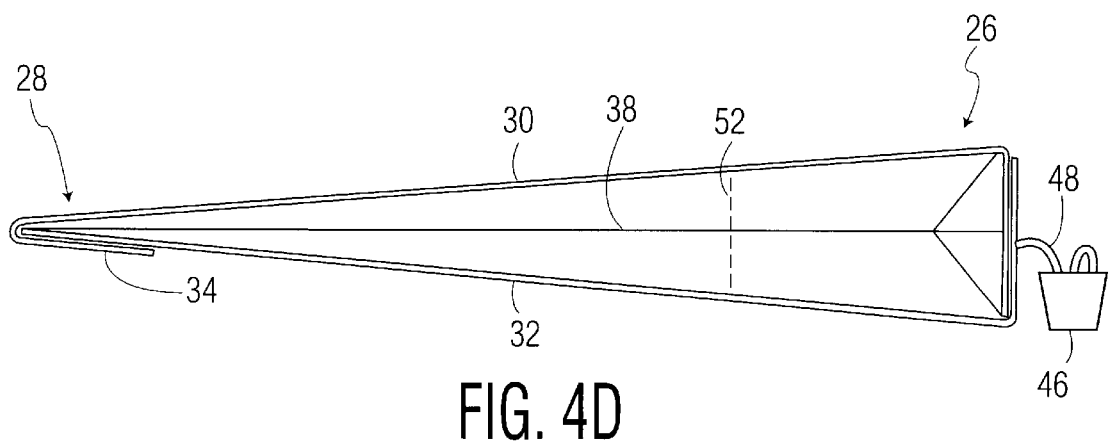

FIG. 3 is a side view of a container having a slightly different shape. It has a rectangular end 16 that is joined by a wedge section 18 to a thinner rectangular section 20. The sections 18 and 20 meet at a tear line 22. It is only necessary that the end of the ice that is in contact with the rods 8 be thick enough to withstand the forces involved. At the same time, it is desirable that this end of the ice be thin enough to permit the grooves such as 8' to be quickly formed to their full depth in order to provide a scraping action. Other shapes for the end of the ice that is to be in contact with the rods 8 that meet the above criteria will occur to one skilled in the art.

FIGS. 4A, 4B, 4C, and 4D illustrate another embodiment of the invention. The cross-section of the entire container is in the shape of a wedge between a large end 26 and a small end 28. A top 30 and a bottom 32 of the container are joined together at the small end 28 as by gluing or by folding them over and gluing as shown at 34. A side 36, and the opposite side, not shown, are foldable along center lines such as the line 38 in the side 36. A cover 40 that is joined to the large end 26, the bottom 30, the side 36 and the other side, not shown, is foldable along a center line 42 extending between the side 36 and the other side so that the entire container can be made flat and therefore more suitable for shipment. In this case, however, a hole 44 is provided in the cover 40 so that a user may fill it with water. Unless the container is to be retained upright while the water is frozen, a stopper 46 and line 48 fastening the stopper 46 to the cover 40 are provided. After water has been frozen in the container of FIGS. 4, 4B, 4C, and 4D a bottom portion 50 is removed after tearing along a tear line 52 with the aid of a tab 54 so as to leave a section 56 to serve as a handle.

Figure 5:
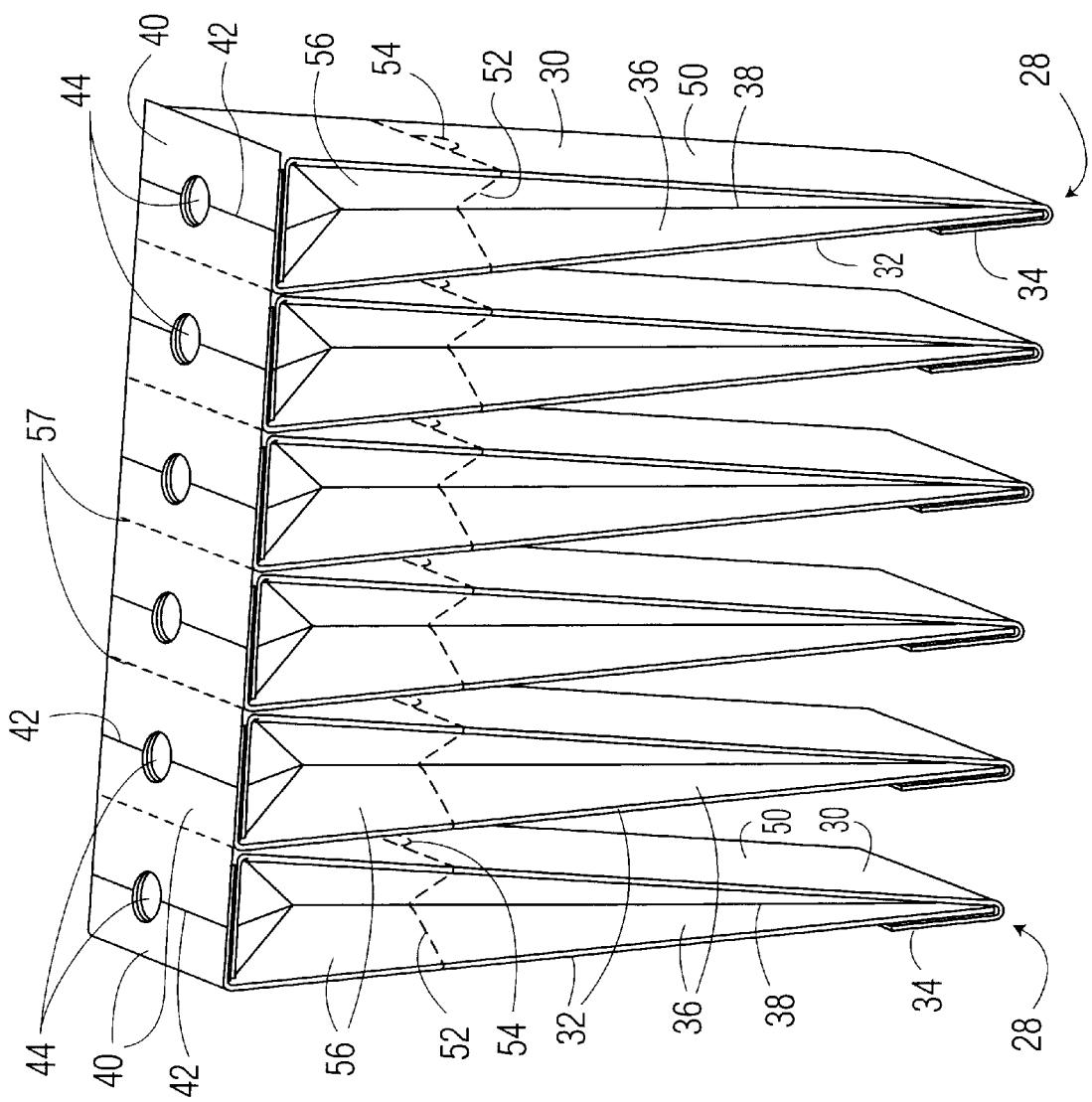
FIG. 5 shows a number of embodiments like that of FIG. 4A joined together.

FIG. 5 shows a number of containers like that of FIGS. 4A, 4B, 4C, and 4D with adjacent sides joined by tear lines 57.

Figure 6:
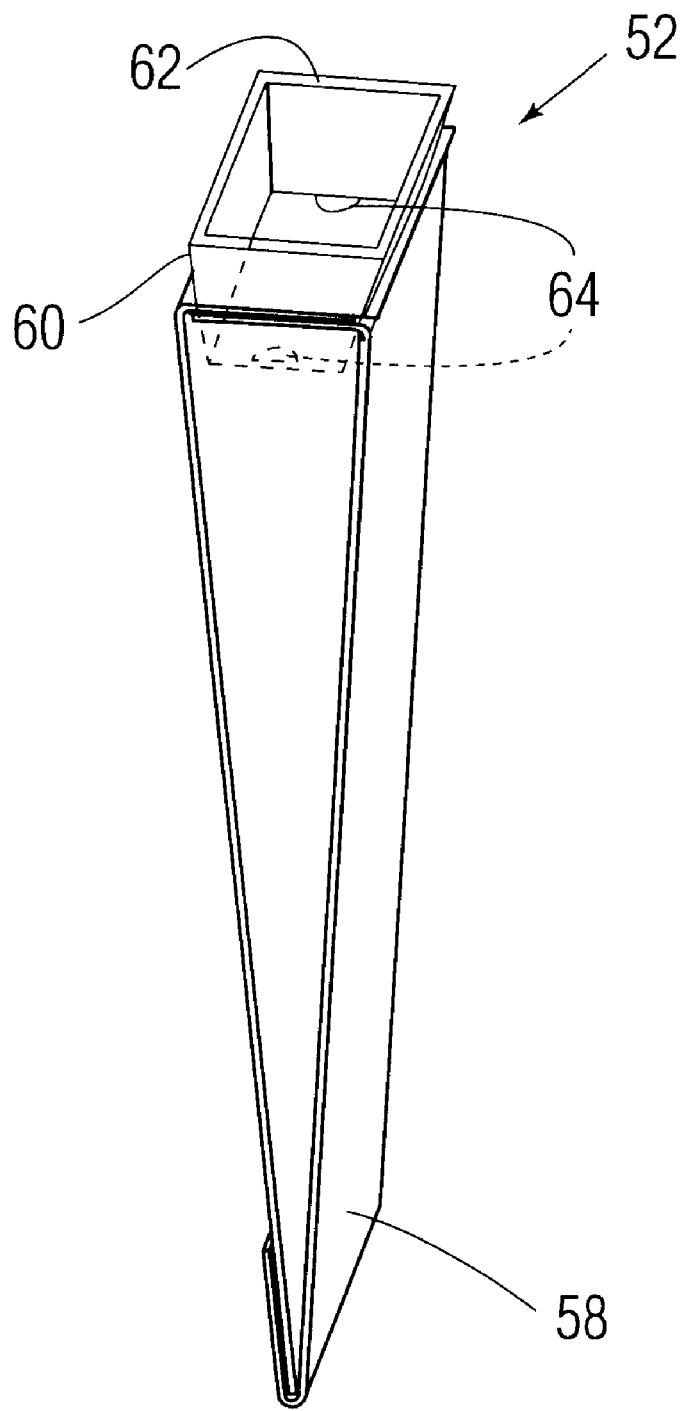
FIG. 6 shows a fourth embodiment of the invention using non-disposable components.

Instead of using a container that is entirely disposable after use, the ice grill cleaner of this invention can be formed in a permanent mold 58, as shown in FIG. 6, to which water frozen therein will not adhere such as metal coated with Teflon®, as in some ice trays. In order to provide an insulating handle for a user to grasp, a hollow insert 60 is provided that fits snugly into the top of the mold 58. Because the cross-section of the mold 58 is tapered, a portion 62 of the insert 60 remains above the mold 58 so that it can be grasped by a user. In use, the mold 58 and the member 60 are filled with water and frozen. The outside of the insert 60 is such as not to adhere to the mold 58, but the inside must be such as to adhere firmly to ice so as not to come loose in use. Alternatively, inward extending tabs 64 could be provided that would be frozen in the ice. The insert 60 is preferably made of reusable material such as plastic, but it could be made of disposable material such as cardboard.

Figure 7:
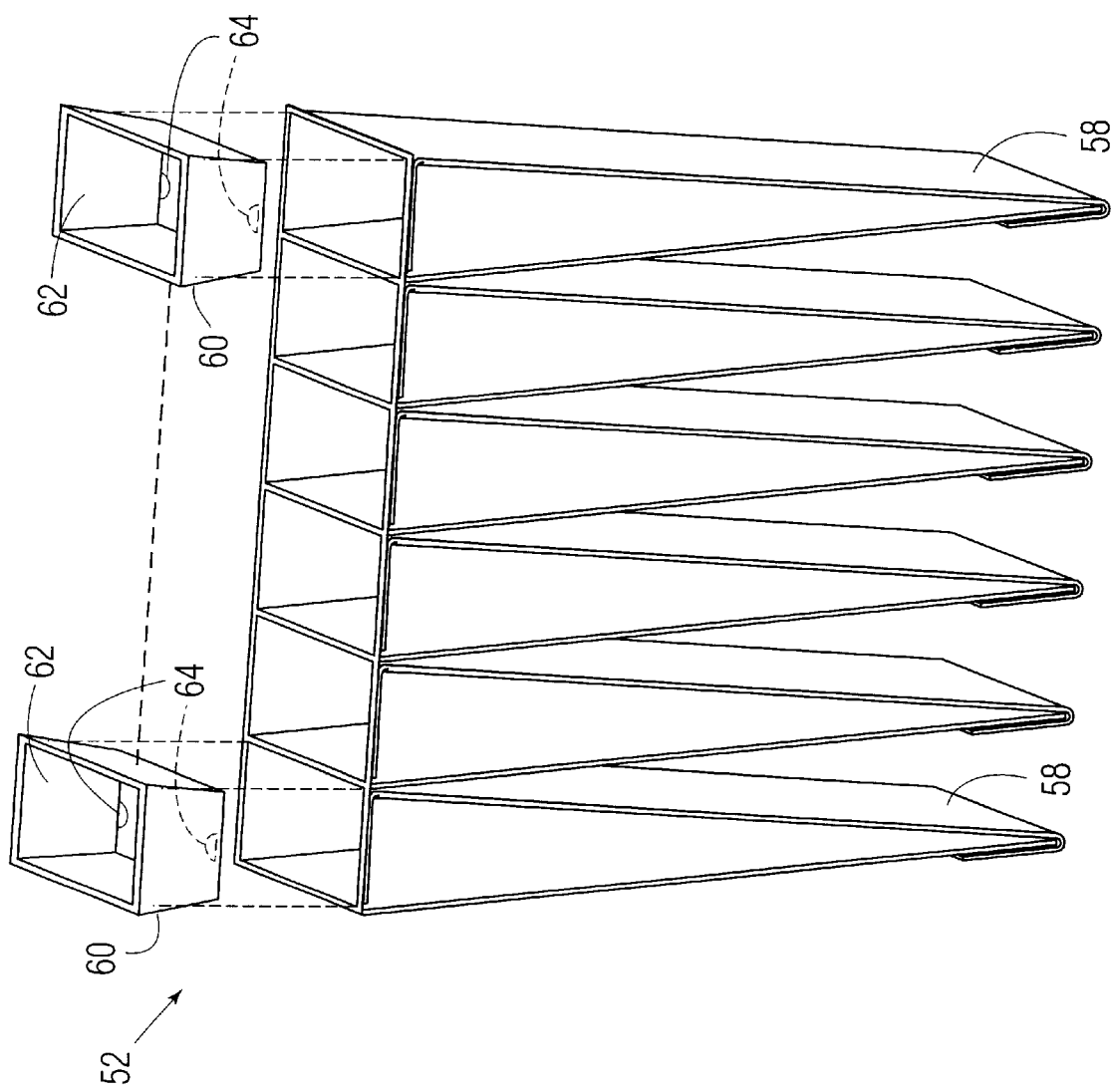
FIG. 7 shows a number of embodiments like FIG. 6 joined together.

FIG. 7 shows a tray formed by joining molds such as shown in FIG. 6 together.

Although various embodiments of the invention have been shown and described in detail, they are not meant to be limiting. Those of skill in the art may recognize certain modifications to these embodiments, which modifications are meant to be covered by the spirit and scope of the appended claims. For example, in the embodiments of the invention shown in FIGS. 6 and 7, as an alternative to using the tab 64, a user could insert a stick vertically into the mold 58 through the insert 60.

What is claimed is:

1. A cleaning device for a barbeque grill, comprising:

a mold having a cavity with a wedge-shaped cross-section at one end;

said mold being made of material that is impervious to water;

an opening in said mold whereby it can be filled with water and frozen;

means for closing said opening; and a tear line around said mold whereby the portion of the mold forming the end with a wedge-shaped cross-section may be removed to expose a wedge of ice for cleaning said grill, while retaining a hand holding portion of said material at the other end.

2. A method for cleaning a hot barbeque grill comprising the steps of:

providing a mold having a wedge-shaped cross-section at one end and a tear line around the mold whereby the wedge-shaped cross-section can be removed;

filling the mold with water;

freezing the water in the mold;

removing the wedge-shaped end of the mold by tearing it along a tear line so as to expose a wedge of ice;

grasping the other end of the mold;

placing the wedge of ice in contact with the grill, whereby the grill melts the ice to form grooves therein; and moving the wedge of ice along the grill.

3. A device for cleaning a grill comprising:

a body of ice having a wedge-shaped cross-section terminating in an edge for application against a grate of said grill at one end; and a handle of temperature insulating material at the other for manipulating said device for cleaning said grate of said grill.

\* \* \* \* \*